United States Patent
Gionet, Jr.

(10) Patent No.: US 6,574,126 B1
(45) Date of Patent: Jun. 3, 2003

(54) COMMUNICATOR POWER SOURCE

(76) Inventor: Charles M. Gionet, Jr., 291 High St., Randolph, MA (US) 02368

(*) Notice: Subject to any disclaimer, the term of this patent is extended or adjusted under 35 U.S.C. 154(b) by 0 days.

(21) Appl. No.: 10/114,605

(22) Filed: Apr. 3, 2002

(51) Int. Cl.$^7$ ................................................ H02M 7/00
(52) U.S. Cl. ........................................................ 363/125
(58) Field of Search ......................... 363/84, 123, 125; 345/8, 211; 455/99, 100, 345, 351

(56) References Cited

U.S. PATENT DOCUMENTS

| | | | |
|---|---|---|---|
| 5,438,702 A | * | 8/1995 | Jackson .................... 455/89 |
| 5,596,491 A | * | 1/1997 | Gold ......................... 363/65 |
| 6,075,857 A | * | 6/2000 | Doss, Jr. et al. ............ 379/430 |

* cited by examiner

*Primary Examiner*—Matthew Nguyen
(74) *Attorney, Agent, or Firm*—John P. McGonagle

(57) ABSTRACT

A communicator power source comprised of a communicator power module and an optional communicator power pack. The communicator power module is attached to a vehicle such as a snowmobile. The optional communicator power pack is attached to a helmet. The communicator power module and pack are interconnected by cables. The communicator power module converts a 12 volt vehicle power source, either alternating current (AC) or direct current (DC), into a clean filtered 9 volt DC output which may be used to power a communicator or similar device or to connect to the invention optional communicator power pack.

10 Claims, 2 Drawing Sheets

COMMUNICATOR POWER SOURCE

BACKGROUND OF THE INVENTION

This invention relates to helmet communicators, and in particular, to power module connected to a vehicle and adapted to provide electrical power to the helmet communicator.

Helmet-mounted communicators are used extensively by people riding vehicles such as snowmobiles and motorcycles. Helmet-mounted communicators are generally voice-activated and powered by a battery pack. The advantage of a voice-activated helmet-mounted communicator is the ability to have hands-free communications with riding companions while steering and controlling a snowmobile or motorcycle.

The limitation with existing helmet-mounted communicators is in the battery pack. The battery packs of prior art communicators cannot be recharged by snowmobiles and motorcycles. Therefore, as the battery pack drains during normal use, communications deteriorates with regard to quality and rated distance. Eventually, when the battery pack completely drains, the communicator becomes unusable. There is no way to recharge the battery pack while out riding on the vehicle.

SUMMARY OF THE INVENTION

The present invention addresses the problem of prior art devices by providing a power module mounted on a snowmobile or motorcycle and adapted to provide electrical power to the helmet communicator. The present invention provides uninterruptable, unlimited power for communicators and eliminates communications problems due to low or dead battery power.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

DETAILED DESCRIPTION OF INVENTION

Figure 1:
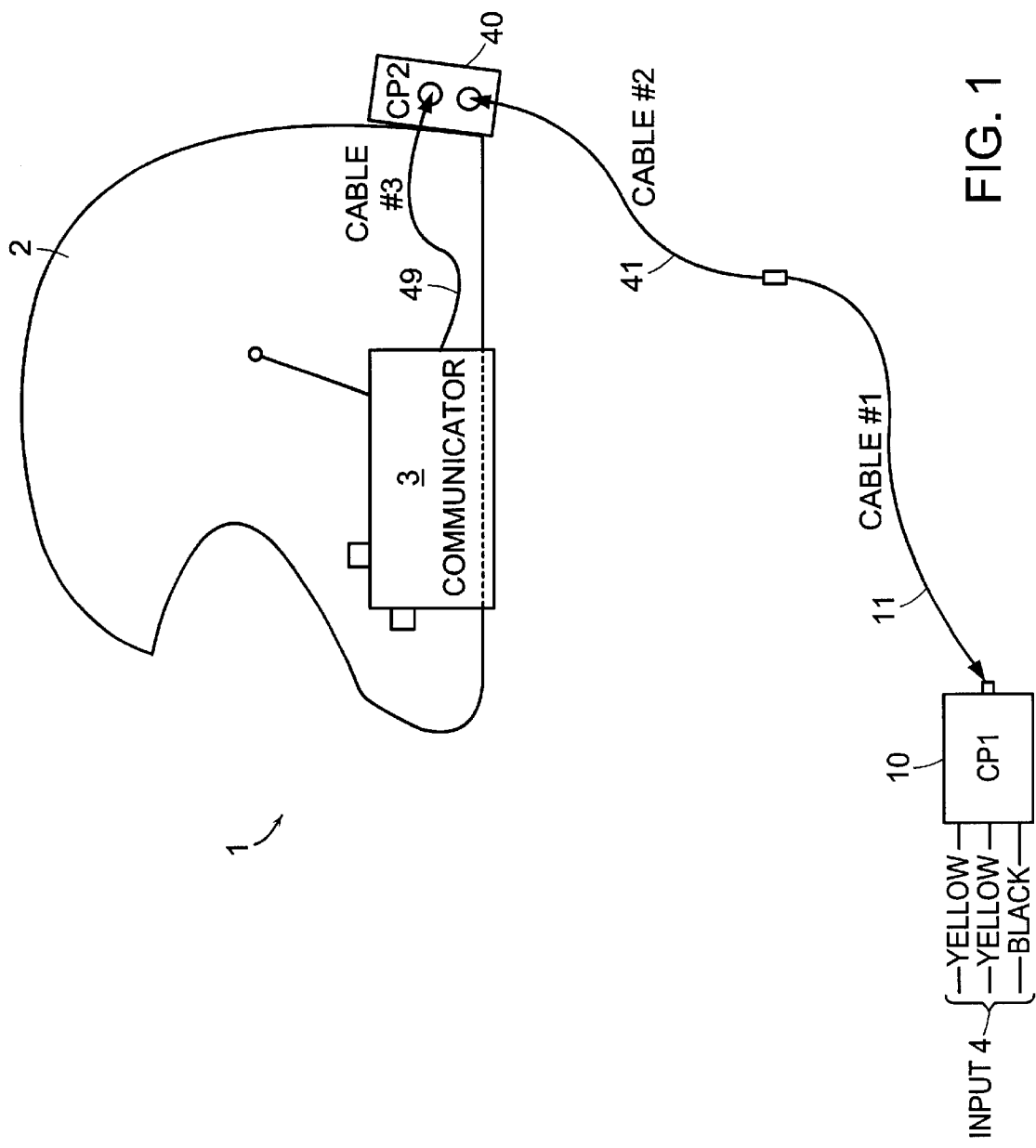
FIG. 1 is a schematic view of the invention.
Figure 2:
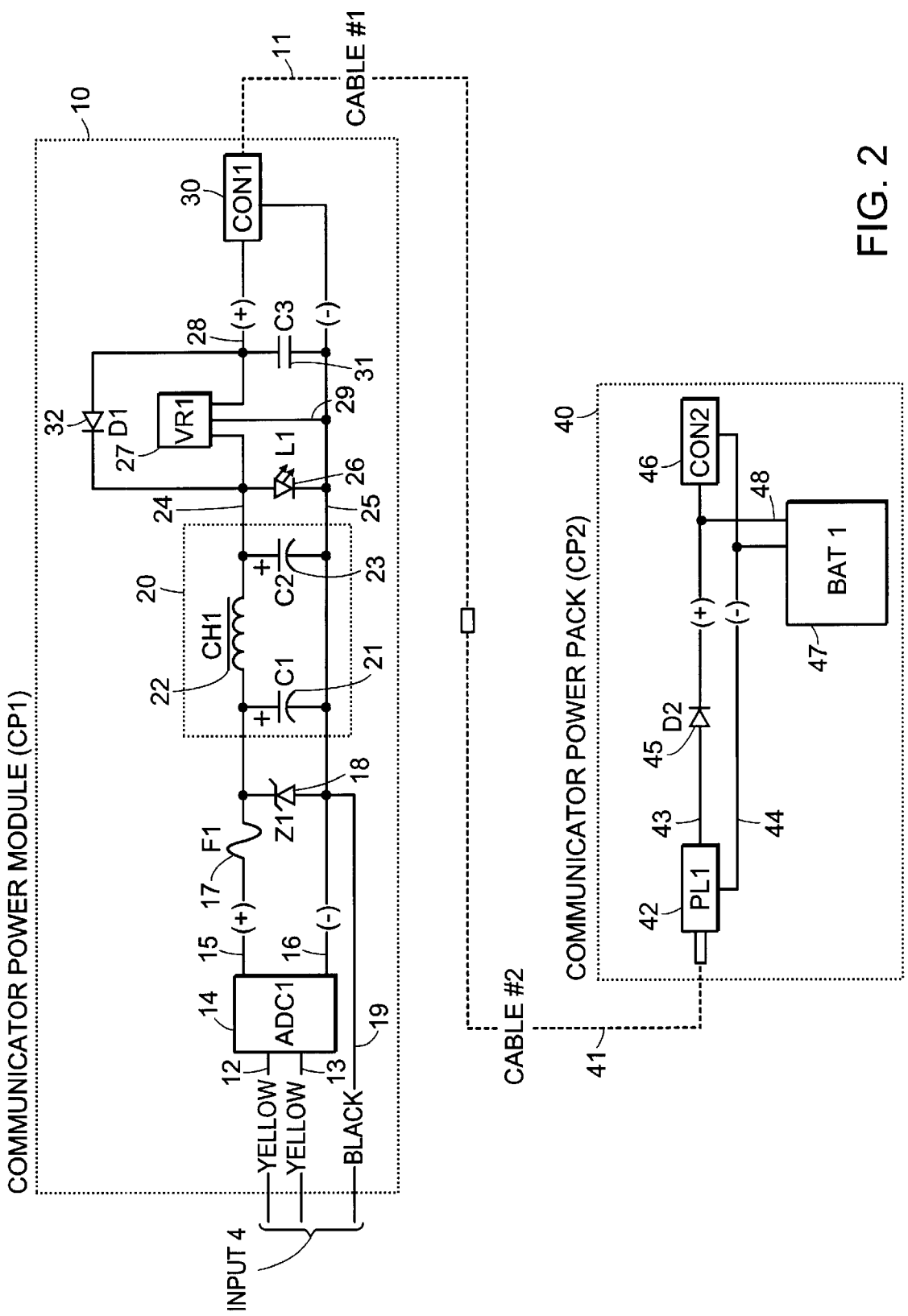
FIG. 2 is an electronic block diagram of the invention.

Referring to the drawings in detail wherein like elements are indicated by like numerals, there is shown a communicator power source 1 constructed according to the principles of the present invention. The invention is comprised of a communicator power module 10 and an optional communicator power pack 40. As may be best seen in FIG. 1, a user wears a helmet 2 to which is attached a communicator 3 such as the Model 900 Communicator sold by Collett Electronics Ltd. The communicator power module 10 is attached to a vehicle such as a snowmobile (not shown). The optional communicator power pack 40 is attached to the helmet 2. The communicator power module 10 and pack 40 are interconnected by a first cable 11 and a second cable 41. A third cable 49 interconnects the communicator power pack 40 with the communicator 3. The communicator power module 10 converts a 12 volt vehicle power source 4, either alternating current (AC) or direct current (DC), into a clean filtered 9 volt DC output which may be used to power a communicator or similar device or to connect to the invention optional communicator power pack 40.

As stated above, the communicator power module 10 is attached to the vehicle. The vehicle power source 4 will typically be either a 12 volt alternating current (AC) or direct current (DC). When the vehicle power source 4 produces an alternating current (AC), such as from a magneto, the vehicle power source 4 is connected by means of two input wires 12, 13 to a full wave bridge rectifier, analog-to-digital converter (ADC) ADC1 14. The input alternating current is thereby converted to a pulsing direct current (DC) signal across two output wires, one positive 15 and one negative 16. The positive output lead 15 is connected in series with a fuse F1 17. After the fuse 17, the output positive lead 15 and output negative lead 16 connect to each side of a Zener diode Z1 18. A Zener diode is a semiconductor diode across which the reverse voltage remains almost constant over a wide range of currents. The fuse 17 and Zener diode 18 combination provide over-voltage and current spike protection. The Zener diode 18 will regulate voltage. If the voltage exceeds a desired level, the Zener diode 18 will draw excessive current flow which will open the fuse 17 stopping all current flow. When the vehicle power source 4 produces a direct current (DC), such as from a vehicle battery, the vehicle power source 4 is connected by means of either of the original two input wires 12, 13 acting as a positive lead and a negative input wire 19 connected to the negative ADC output lead 16, thereby by-passing the analog-to-digital converter 14.

The DC output across leads 15 and 16 is then passed to a filter circuit 20 comprised of a first parallel capacitor C1 21, a series inductor CH1 22, and a second parallel capacitor C2 23. The filter circuit 20 smooths out the pulsing DC signal and noise picked up by the signal. The filtered output leads, i.e., positive 24 and negative 25, have a light emitting diode (LED) 26 across the leads 24, 25 wherein the LED 26 is illuminated if the fuse 17 is not blown thereby indicating current flow in the communicator power module 10.

The filtered output leads 24, 25 are then connected to a voltage regulator 27. In this embodiment of the invention the voltage regulator 27 steps down an input 12 volt DC to an output 9 volt DC. The voltage regulator positive output lead 28 and negative output lead 29 are electrically attached to a communicator power module output connector 30. A filter capacitor C3 31 is attached across the voltage regulator output leads 28, 29 just prior to the output connector 30. The filter capacitor 31 filters out high frequency noise generated by the load on the output connector 30. The voltage regulator 27 is protected by a by-pass diode D1 32 interconnecting the filtered, positive lead 24 with the regulated positive output lead 28. The by-pass diode 32 provides protection if a large amount of capacitance is connected on the output connector 30 when the vehicle input is terminated or fuse F1 17 is blown.

As stated above, the communicator power pack 40 is attached to a user's helmet 2. The communicator power pack 40 receives a 9 volt DC input from the communicator power module output connector 30. The communicator power module output connector 30 has a cable 11 attached thereto. This cable 11 is attached to a communicator power pack input cable 41. The communicator power pack input cable 41 interconnects the communicator power module output connector cable 11 with a communicator power pack input plug 42. The plug 42 has two output leads, a positive lead 43 and a negative lead 44. The positive lead 43 has a diode D2

45 in series so that current flow is assured in one direction only. The positive lead 43 with diode 45, and negative lead 44 are electrically connected to an output connector 46. A rechargeable battery 47 is electrically connected across the leads 43, 44. The positive battery lead 48 is joined to the positive lead 43 between the diode 45 and the output connector 46. The diode 45 prevents the battery 47 from backfeeding through the input plug 42 when the vehicle power source 4 is absent.

The operational purpose of the invention 1 is to convert a 12 volt vehicle power source input 4 (AC or DC) into a clean filtered 9 volt DC output at the communicator power module output connector 30. The 9 volt DC output at the connector 30 may be used for directly powering a communicator or similar device. Alternatively, the 9 volt DC output at the connector 30 may be cabled to the communicator power pack input plug 42 to maintain a charge on the battery 47 and/or provide a 9 volt DC at the communicator power pack output connector 46 for powering a communicator or similar device. For example, in FIG. 1 the output from the communicator power pack output connector 46 is connected to the communicator 3 by means of a third cable 49.

When the communicator power module 10 and communicator power pack 40 are connected in series, the communicator power module 10 converts a 12 volt AC or DC vehicle power source 4 into a clean, filtered 9 volt DC output. The communicator power module 10 also has the ability to stop an over-voltage or voltage spike from passing into the communicator power pack 40. If the communicator power pack battery 47 is not fully charged, it will automatically charge to full capacity. If the 12 volt vehicle input 4 were to fail, or if an over-voltage were to blow the fuse 17 (indicated by the LED 26 losing illumination), or if the communicator power pack 40 becomes disconnected from the communicator power module 10, the communicator power pack battery 47 would deliver a 9 volt DC output to the communicator power pack output connector 46 and the communicator power pack diode 45 would prevent the battery 47 from backfeeding to the communicator power pack input plug 42 and possibly back to the communicator power module 10.

It is understood that the above-described embodiment is merely illustrative of the application. Other embodiments may be readily devised by those skilled in the art which will embody the principles of the invention and fall within the spirit and scope thereof.

I claim:

1. A communicator power source adapted for use with a communicator attached to a helmet, comprising:
    a communicator power module attached to a vehicle having a power source, said power module adapted to convert an output from said vehicle power source into a clean filtered direct current output;
    a communicator power pack attached to said helmet;
    a plurality of cables adapted to interconnect said power module and said power pack, to interconnect said power pack with said communicator, and to interconnect said power module with said communicator;
    wherein said power module clean filtered direct current output is adapted to power said communicator and said power pack.

2. A communicator power source as recited in claim 1, wherein said power module is comprised of:
    an analog-to-digital converter connected to the vehicle power source output and adapted to convert said output to a pulsing direct current output;
    a filter circuit connected to said analog-to-digital converter pulsing direct current output and adapted to receive said pulsing direct current and smooth out the pulsing direct current;
    a voltage regulator connected to said filter circuit, said voltage regulator adapted to adjust the smoothed out pulsing direct current and provide a desired output voltage level on voltage regulator output leads, said leads being a positive lead and a negative lead; and
    an output connector connected to said voltage regulator output leads.

3. A communicator power source as recited in claim 2, further comprising:
    two analog-to-digital converter output wires, one positive and one negative, said output wires containing said pulsing direct current;
    a fuse with an input end and an output end, said fuse input end connected to said analog-to-digital converter positive output wire;
    a zener diode having two ends, one end being connected to said fuse output end, and the other zener diode end being connected to said analog-to-digital converter negative output wire;
    wherein, said filter circuit connection to said analog-to-digital converter pulsing direct current output is across said zener diode ends.

4. A communicator power source as recited in claim 3, wherein said filter circuit is comprised of:
    a first parallel capacitor with a positive side and a negative side;
    a second parallel capacitor with a positive side and a negative side; and
    a series inductor interconnected between said first and second parallel capacitor positive sides;
    wherein said first parallel capacitor sides are connected to said zener diode ends;
    wherein said voltage regulator is connected to said second parallel capacitor sides.

5. A communicator power source as recited in claim 4, further comprising:
    a light emitting diode (LED) connected in parallel to said second parallel capacitor sides.

6. A communicator power source as recited in claim 5, wherein:
    said plurality of cables is comprised of a first and second cable interconnecting the power module and power pack, and a third cable interconnecting the power pack with the communicator.

7. A communicator power source as recited in claim 6, wherein:
    said first and second cables interconnect said power module output connector with said power pack, thereby providing a direct current input from the power module to said power pack, said power pack having an input plug adapted to receive said cables, said plug having two output leads, a positive lead and a negative lead, said positive lead having a diode D2 in series so that current flow is assured in one direction only, said positive lead with diode, and negative lead being electrically connected to an output connector, said power pack having a rechargeable battery electrically connected across said leads, said battery having a positive battery lead joined to the positive lead between the diode and the output connector, wherein said diode prevents the battery from backfeeding through the input plug when the vehicle power source is absent.

8. A communicator power source as recited in claim 7, wherein:
    the analog-to-digital converter is a full wave bridge rectifier.

9. A communicator power source as recited in claim 8, further comprising:
 a filter capacitor attached across the voltage regulator output leads prior to the output connector;
 a by-pass diode interconnecting the second parallel capacitor positive side with the voltage regulator positive output lead.

10. A communicator power source as recited in claim 9, further comprising:
 a negative input wire connected to the negative analog-to-digital converter output wire, thereby by-passing the analog-to-digital converter.

* * * * *